No. 774,167. Patented November 8, 1904.

UNITED STATES PATENT OFFICE.

WILLIS EUGENE EVERETTE, OF TACOMA, WASHINGTON.

DIRECT CASTING AND HARDENING OF METAL FOR ARMOR-PLATE, &c.

SPECIFICATION forming part of Letters Patent No. 774,167, dated November 8, 1904.

Application filed March 31, 1904. Serial No. 200,993. (No specimens.)

*To all whom it may concern:*

Be it known that I, WILLIS EUGENE EVERETTE, a citizen of the United States, and a resident of Tacoma, in the county of Pierce and State of Washington, have invented certain new and useful Improvements in Direct Casting and Hardening of Armor - Plate and Metal, of which the following is a specification.

The object of my invention is to improve the process of manufacturing armor - plate, projectiles, tool metal, railroad - rails, and other forms of traction and structural metals, whether the same is in the form of wrought or cast metal. It is especially designed to enable these various articles to be produced by direct casting under such conditions that when so produced they have nearly if not quite the qualities of wrought metal; but it also simplifies and cheapens the process of manufacture when direct casting is not employed, thus giving to the wrought metal peculiar strength, toughness, and hardness. This process may be applied either to pig metal or to the raw ore and dispenses with the necessity of having to bessemerize the molten metal. Instead of the usual flux, which is the carbonate of an alkali—such as lime, potash, or soda—I employ a cyanid. The purpose of the carbonate and of the cyanid is to get rid of the oxygen contained in the material to be treated; but in so doing when a carbonate is used new oxids are formed, which have to be removed by a subsequent process, so that the metal from the first melting cannot be run into ingots or otherwise cooled, so that it may be rolled or acted upon mechanically for the production of armor-plate or other desired articles. This is owing to the presence of so much oxygen in the carbonate, which therefore combines with other elements to form oxids. When, however, a cyanid of an alkali is used as a flux, this difficulty does not arise, and the use of a cyanid as a flux has the further advantage that it produces a valuable slag.

The cyanids employed are preferably the cyanid of calcium, (which is the cheapest,) the cyanid of soda, and the cyanid of potash. The slag thus produced is valuable for fertilizer, the cyanid-of-calcium slag being suitable for plants that require a heavy soil, the cyanid-of-soda slag being used for ordinary grain, wheat, and plant growth, while the cyanid-of-potash slag is particularly valuable in the cultivation of tobacco, as that plant requires a large potassic content in the soil. In the ground the cyanid of course decomposes into ammonia and nitrates.

The method of applying a cyanid of an alkali as a flux which I prefer to use is the following: A quantity of pig metal or raw ore is placed in a suitable furnace with the proportionate quantity of flux and heated to about 2,800° Fahrenheit. Both the pig metal and raw ore have been previously finely crushed, and the quantities to be used are sixty per cent. of pig or ore and forty per cent. of flux. The composition of the flux differs slightly for the ore and for the pig metal. For each the flux consists, preferably, of one-eighth iron oxid, one-eighth metallic aluminium, one-eighth alkaline nitrate, and the remaining five - eighths carbon and alkaline cyanid. For pig metal two of these five - eighths are cyanid, while for raw ore only one-eighth is cyanid. All of these ingredients are pulverized and well mixed. Fusion is rapid at the stated temperature. When the molten mass in the furnace is ready to pour, I inject into it while still in the furnace, by suitable pressure, a boiling liquid composed of a quantity of molten cyanid of the desired alkali equal to five per cent. of the charge in the furnace, to which have been added pulverized sulfid of molybdenum, pulverized metallic chromium, manganese, and aluminium in varying quantities, depending upon the purpose for which the metal is to be used. For example, armor-plate and projectiles will require about ten pounds each of the sulfid of molybdenum and metallic chromium and about five pounds each of pulverized metallic manganese and metallic aluminium for each one hundred pounds of the molten cyanid. Railway-rails will require about the same proportion; other articles, such as tool metal, &c., only one-tenth of those quantities for every one hundred pounds of cyanid. As soon as the high fusion caused by this mixture takes place I draw off the molten mass into suitable molds, which are preferably made of carbon-lined silica sand. If the material is to be used as a direct casting, I cool it down to low red heat (about 1,000° Fahrenheit) and after scratching the surface of the hot metal free from carbon, dirt, sand, and adhering impurities I subject the incandescent metal to a spray of intensely-cold liquid carbonic acid. The carbon will unite with the incandescent metal and immediately form an extremely dense and hard crystallized carbid, which extends deeply into the interior of the incandescent metal, thereby rendering the same very tough and dense, capable of resisting the strain, use, wear, and blows to which steel is subjected when used for the purposes specified. This hardening action depends upon the fact that when the cyanid of an alkali is in contact with liquid iron in the presence of sufficient oxygen it will partly decompose and rapidly evolve a volatile nitrid of carbon-gas and if immediately cooled will form into alkaline ferro and ferri cyanids; but if the temperature inside the furnace is exceedingly high, as is the case when oxygen and pulverized aluminium are combined with carbon in an incandescent mass, the heat generated becomes such that the nitrogen of the cyanid escapes into the air. The alkaline cyanid, therefore, becomes an alkaline carbid, which in turn decomposes and becomes an alkaline oxid, because the alkali has greater affinity for oxygen than it has for carbon. The carbon thus freed from the carbid instantly combines with a part of the free oxygen present, forming carbon monoxid, which is absorbed in part by the molten metal, where it is held until at the moment of cooling part of it is explosively expelled as a gaseous carbon monoxid.

When the material is not to be used as a cast metal, but is to be rolled or otherwise wrought, the molten mass is not necessarily cooled before treatment, but may be treated like ordinary melted metal and rolled or otherwise manipulated at the usual temperatures.

I claim—

The method of direct casting and hardening of metal for armor-plate and other articles, which consists in melting a charge of metal or metallic ore by a flux, consisting of the cyanid of an alkali, and injecting into the molten mass, a quantity of molten cyanid of an alkali, mixed with from one to ten per cent. of pulverized sulfid of molybdenum, from one-half to five per cent. of metallic manganese, from one to ten per cent. of chromium and from one-half to five per cent. of aluminium, and drawing off and cooling the molten mass by a spray of liquid carbonic acid.

WILLIS EUGENE EVERETTE.

Witnesses:
W. P. PREBLE, Jr.,
A. H. VAN HORENBERG.